United States Patent [19]
Hatanaka et al.

[11] Patent Number: 6,095,654
[45] Date of Patent: Aug. 1, 2000

[54] PROJECTION TYPE DISPLAY APPARATUS

[75] Inventors: Masato Hatanaka, Saitama; Yusaku Tagawa; Hideki Katsuragawa, both of Tokyo, all of Japan

[73] Assignee: Sony Corporation, Tokyo, Japan

[21] Appl. No.: 09/135,796

[22] Filed: Aug. 18, 1998

[30] Foreign Application Priority Data

Aug. 20, 1997 [JP] Japan .................................... 9-223588
Aug. 20, 1997 [JP] Japan .................................... 9-223589

[51] Int. Cl.$^7$ ................................................. G03B 21/28
[52] U.S. Cl. ............................. 353/37; 353/99; 353/119
[58] Field of Search ................................. 353/31, 34, 37, 353/38, 78, 99, 98, 119, 74, 77; 349/8, 7, 5

[56] References Cited

U.S. PATENT DOCUMENTS

| | | | |
|---|---|---|---|
| 5,098,184 | 3/1992 | Van Den Brandt et al. | 353/38 |
| 5,623,349 | 4/1997 | Clarke | 349/8 |
| 5,662,401 | 9/1997 | Shimizu et al. | 353/38 |
| 5,726,719 | 3/1998 | Tanaka et al. | 349/8 |
| 5,786,939 | 7/1998 | Watanabe | 353/38 |
| 5,852,479 | 12/1998 | Ueda et al. | 349/9 |
| 5,868,481 | 2/1999 | Conner et al. | 353/38 |

*Primary Examiner*—William Dowling
*Attorney, Agent, or Firm*—Jay H. Maioli

[57] ABSTRACT

A projection type display apparatus which allows a reduction in size and which enables images to be clearly projected. In a projection type display apparatus 1 in which an image displayed by an image display device 53 is projected onto a screen by using light from a light source 3, the light from the light source 3 is transmitted through an optical element as illuminating light and guided along a first optical axis OP1 before it is reflected by a first reflecting mirror; and the illuminating light is reflected by a second reflecting mirror and guided toward the image display device 53 along a second optical axis OP2. The first optical axis OP1 and the second optical axis OP2 are arranged at different positions and parallel to each other. Arranged in the first optical axis OP1 is an optical element for concentrating the intensity distribution of the illuminating light, and the optical element is formed by two-dimensionally arranging a plurality of unit lenses. The ratio of the size d of the unit lens to the size D of the image display device 53, d/D, is set to be as follows:

$$\tfrac{1}{16} \leq d/D \leq \tfrac{1}{7}$$

13 Claims, 11 Drawing Sheets

LIGHT SOURCE

PROJECTION TYPE DISPLAY APPARATUS

BACKGROUND OF THE INVENTION

1. Field of the Invention

The present invention relates to an improved projection type display apparatus that projects an image displayed by an image display device onto a screen by using light from a light source.

2. Description of the Related Art

There have been proposed various types of a so-called projection type display apparatus that displays an image displayed by an image display device on a screen or the like by using light from a light source.

Figure 1:
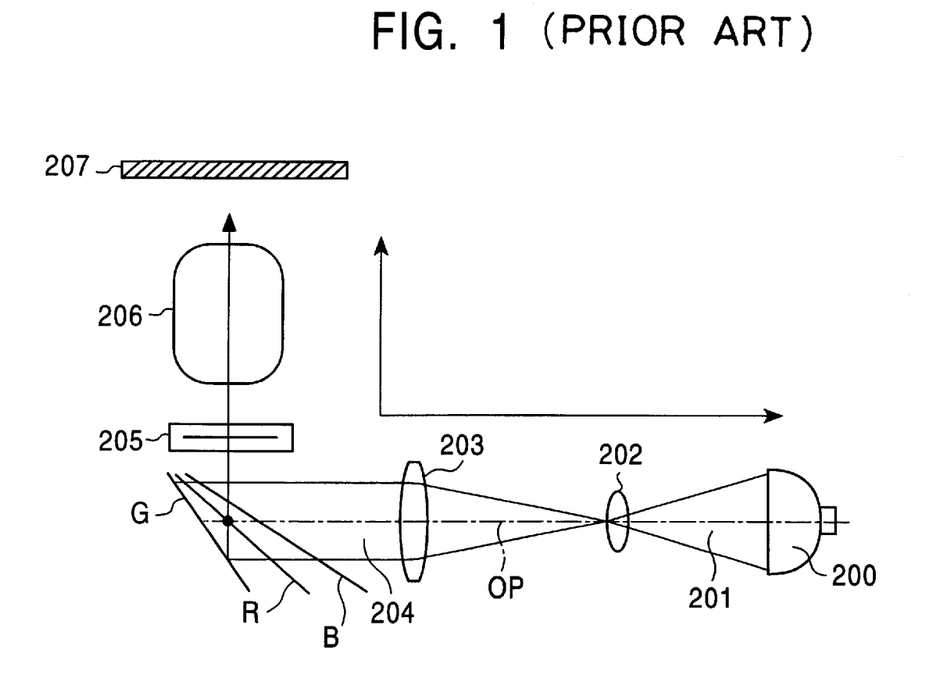
FIG. 1 is a diagram showing the optical system of a conventional projection type display apparatus.

FIG. 1 shows the optical system of a conventional projection type display apparatus.

In FIG. 1, light 200 from a light source 201 focuses at a lens 202, which condenses light on a lens 203 side, and the lens 203 turns the light into parallel light 204. The parallel light 204 is reflected substantially 90° at color filters of green G, red R and blue B before it is transmitted through a liquid crystal display device 205. At this time, an image displayed by the liquid crystal display device 205 undergoes synthesis by the light from the color filters and is led toward a screen 207 through a projection lens 206.

In this conventional optical system, the distance from the light source 200 to the projection lens 206 is considerably long. This is due to the fact that the light source 200, the lenses 202 and 203, the color filters, the image display device 205 and the projection lens 206 are linearly arranged along the optical axis OP, which is bent only at one point, where the color filters are arranged. In order for these optical elements to be accommodated, the size of the conventional projection type display apparatus must inevitably be large. Further, there is a request for a projection of the image of the image display device which is clearer than ever.

SUMMARY OF THE INVENTION

It is accordingly an object of the present invention to eliminate the above problem and to provide a projection type display apparatus which can be reduced in size and which enables an image to be clearly projected.

According to claim 1, the present invention provides a projection type display apparatus comprising: a light source for applying irradiation light to a first optical axis extending in a first direction, first reflection means provided in the first optical axis and adapted to reflect the irradiation light to a second optical axis extending in a second direction that is different from the first direction, second reflection means for reflecting the irradiation light on the second optical axis to a third optical axis extending in a third direction that is different from the second direction, and an image display device on which the irradiation light impinges.

According to claim 2, the present invention provides a projection type display apparatus wherein the first optical axis and the third optical axis are substantially parallel to each other.

According to claim 3, the present invention provides a projection type display apparatus further comprising an optical element for concentrating the intensity distribution of the irradiation light on the third optical axis.

According to claim 4, the present invention provides a projection type display apparatus further comprising a reflection element provided in the third optical axis and adapted to reflect illumination light on the third optical axis, wherein the illumination light reflected by the reflection element is transmitted through the image display device to project the image displayed by the image display device onto a screen.

According to claim 8, the present invention provides a projection type display apparatus comprising: a light source for applying irradiation light to a first optical axis extending in a first direction, optical means upon which the irradiation light impinges and which outputs the irradiation light after concentrating the intensity distribution thereof, and an image display device upon which the irradiation light from the optical means impinges, wherein the optical means is formed by two-dimensionally arranging a plurality of unit lenses and wherein the ratio of the size d of the unit lens to the size D of the image display device, d/D, is set to be as follows:

$$1/16 \leq d/D \leq 1/7$$

According to claim 9, the present invention provides a projection type display apparatus further comprising first reflection means for reflecting the irradiation light from the optical means to a second optical axis extending in a second direction that is different from the first direction, and second reflection means for reflecting the irradiation light on the second optical axis to a third optical axis extending in a third direction that is different from the second direction.

According to claim 10, the present invention provides a projection type display apparatus further comprising a reflection element which is provided in the third optical axis and which reflects illumination light on the third optical axis, wherein the illumination light reflected by the reflection element projects an image transmitted through the image display device and is displayed by the image display device onto a screen.

According to claims 5 and 11, the present invention provides a projection type display apparatus wherein the image display device is a single-plate type image display device.

According to claims 6 and 12, the present invention provides a projection type display apparatus wherein the image display device is a liquid crystal display device.

According to claims 7 and 13, the present invention provides a projection type display apparatus wherein the reflection element consists of dichroic mirrors having red, blue and green color filter functions.

According to claim 14, the present invention provides a projection type display apparatus wherein the optical element consists of a plurality of fly eye lenses.

DETAILED DESCRIPTION OF THE PREFERRED EMBODIMENTS

A preferred embodiment of the present invention will be described in detail with reference to the accompanying drawings.

In the embodiment described below, which is a preferred embodiment of the present invention, there are various technically preferable restrictions. However, the scope of the present invention is not restricted to these forms unless otherwise stated in the following description.

Figure 2:
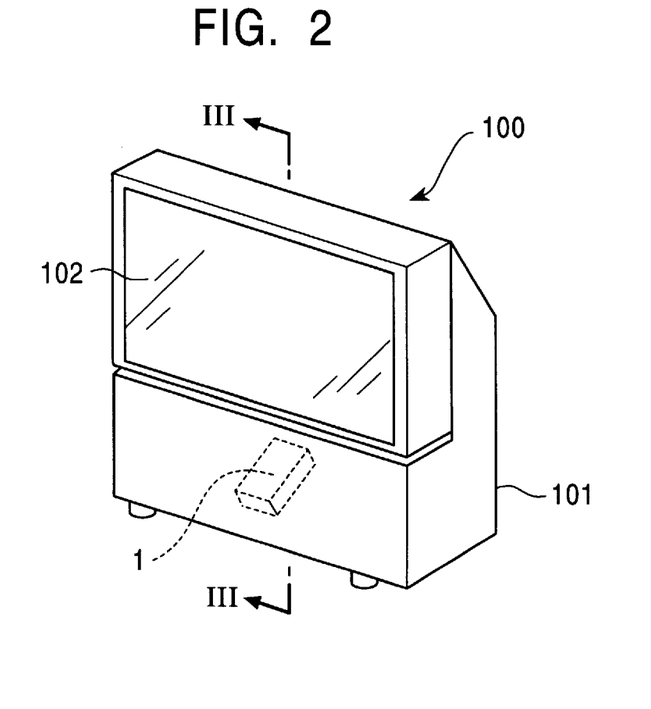
FIG. 2 is a perspective view of a television set equipped with a projection type display apparatus according to a preferred embodiment of the present invention.
Figure 3:
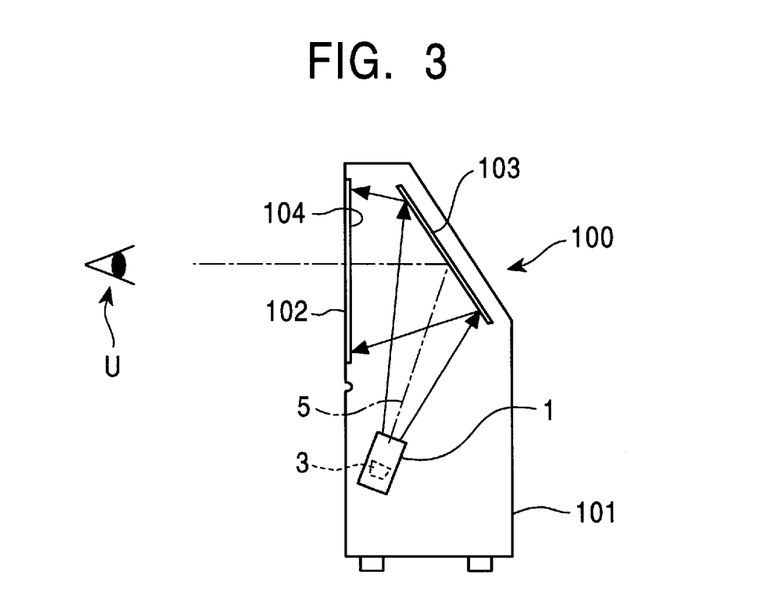
FIG. 3 is a sectional view taken along the line III—III of the television set of FIG. 2.

FIG. 2 is an external representation showing a projection type display apparatus according to a preferred embodiment of the present invention. FIG. 3 shows a liquid crystal rear projection type television set 100 equipped with the projection type display apparatus 1 shown in FIG. 2. FIG. 3 is a sectional view taken along the line III—III of FIG. 2, showing the internal construction of the television set 100.

First, the construction of this television set 100 will be schematically described. In FIGS. 2 and 3, the television set 100 includes a cabinet 101, a screen 102, a mirror 103, and a projection type display apparatus 1. Projection light 5 with which the projection type display apparatus 1 performs projection by using light from a light source 3 is reflected by the mirror 103 and projected from the rear surface 104 of the screen 102.

The image projected onto the screen 102 can be seen by the user U as a color image or a monochrome image.

In the embodiment described below, a color image can be projected and displayed on the screen 102.

Figure 4:
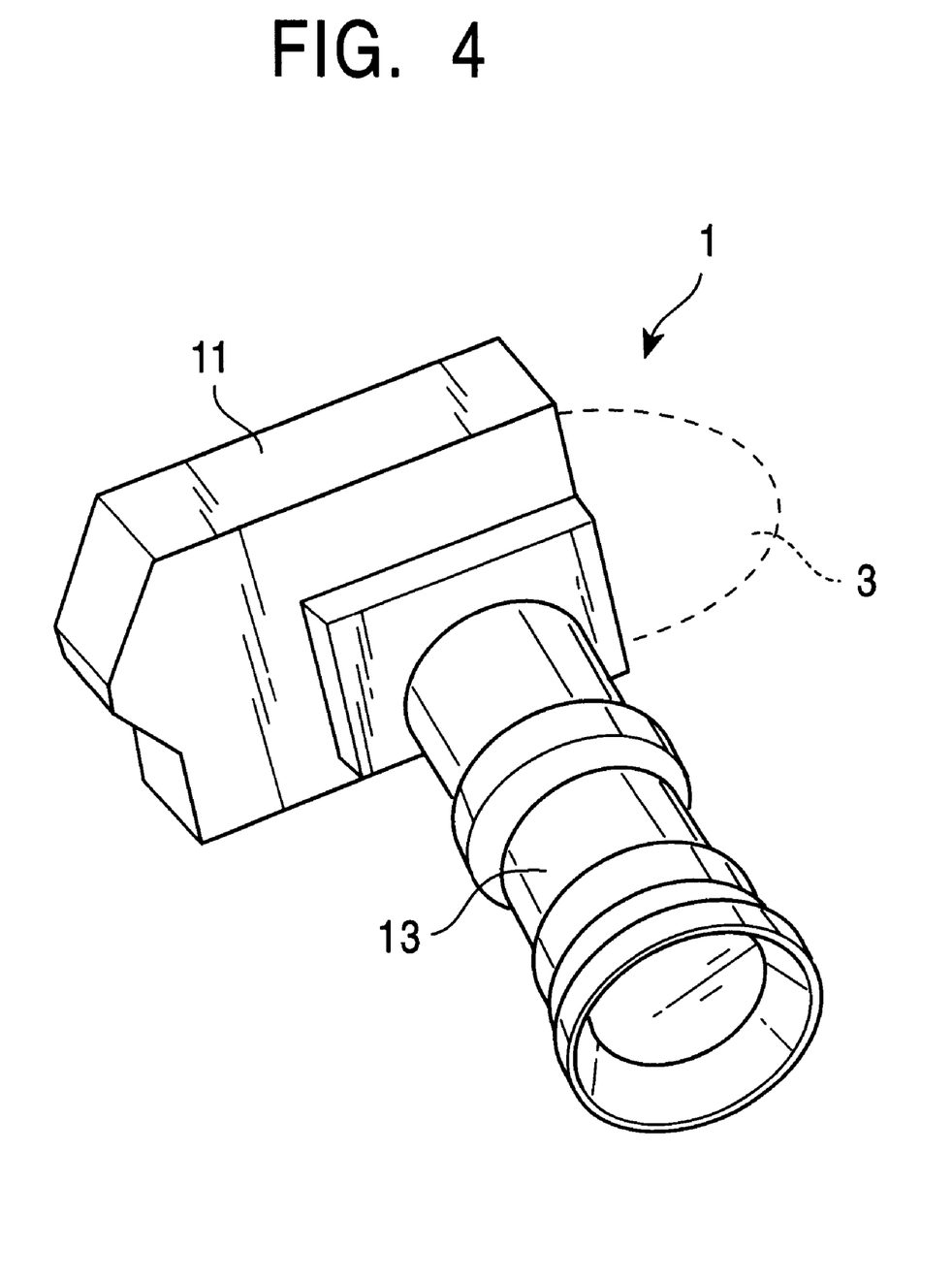
FIG. 4 is a perspective view showing a preferred embodiment of the projection type display apparatus shown in FIGS. 2 and 3.
Figure 5:
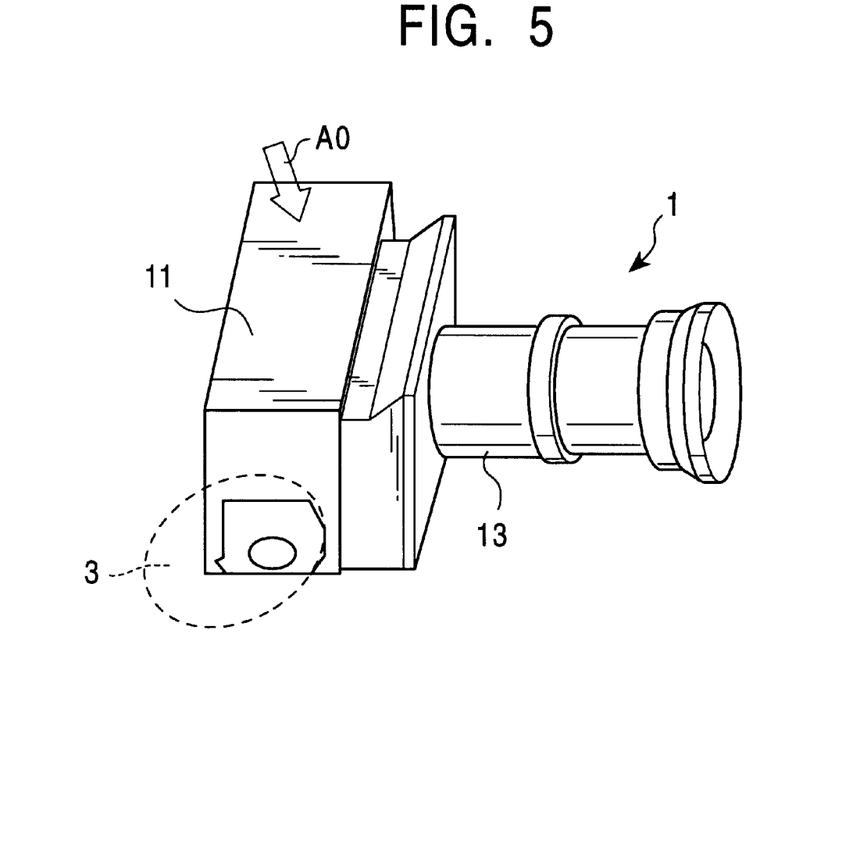
FIG. 5 is a perspective view showing the bottom side of the projection type display apparatus shown in FIG. 4.
Figure 6:
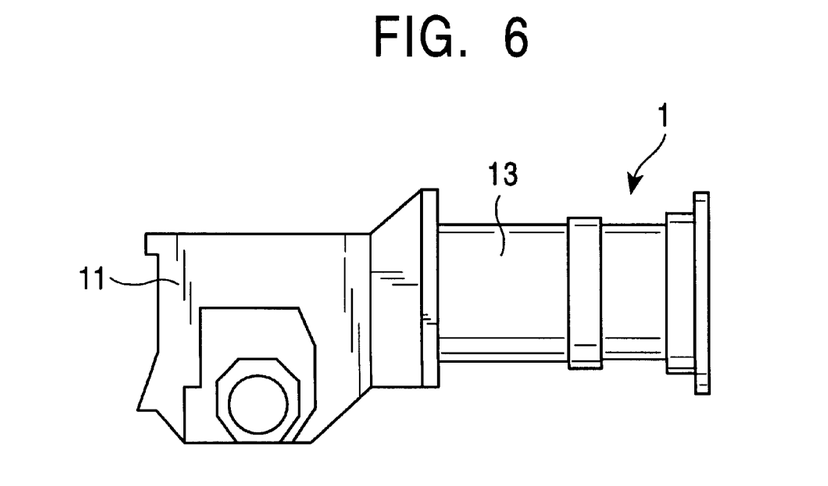
FIG. 6 is a side view of the projection type display apparatus.

FIGS. 4 through 6 specifically show the appearance of the projection type display apparatus 1 shown in FIGS. 2 and 3. As shown in FIGS. 4 through 6, the projection type display apparatus 1 includes a main body 11, a projection lens barrel portion 13, and a light source 3.

The main body 11 and the projection lens barrel portion 13 are formed into an integral unit. The light source 3 can be detachably mounted to the main body 11.

Figure 7:
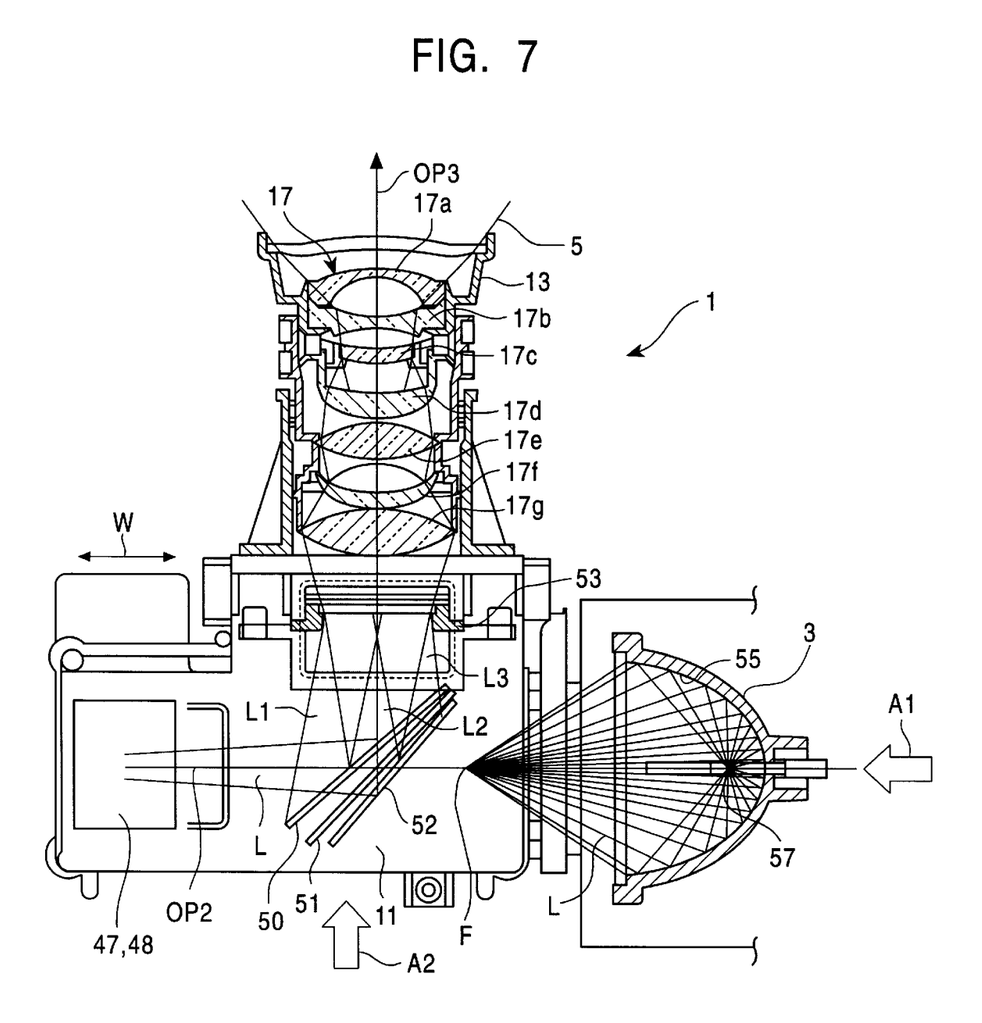
FIG. 7 is a diagram showing the internal construction of the projection type display apparatus, as seen from the direction of the arrow A0, of the projection type display apparatus shown in FIG. 5.

FIG. 7 shows the projection type display apparatus 1 as seen from the direction of the arrow A0 of FIG. 5. The diagram shows the internal construction of the apparatus.

Figure 8:
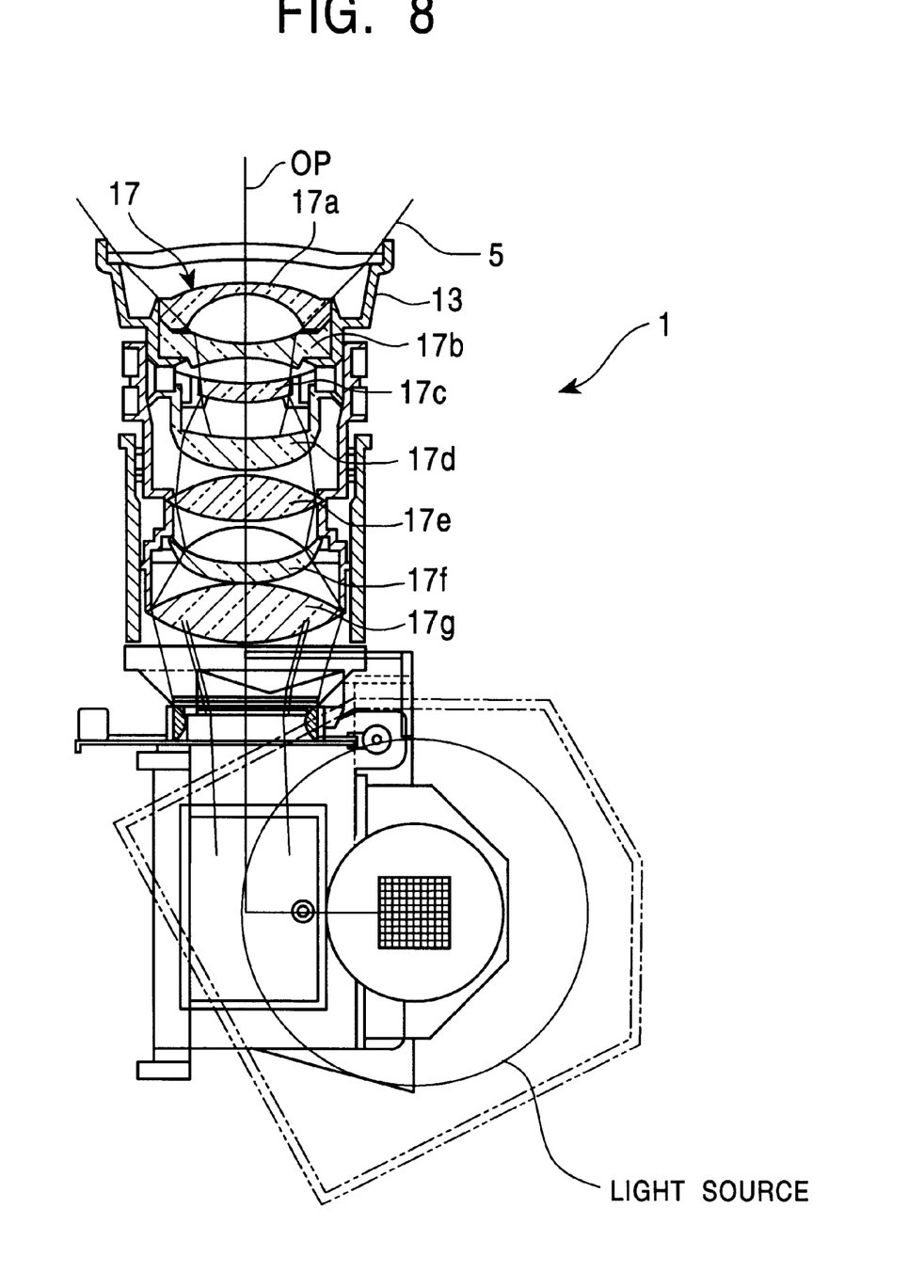
FIG. 8 is a diagram showing the internal construction of the projection type display apparatus as seen from the direction of the arrow A1 of FIG. 7.
Figure 9:
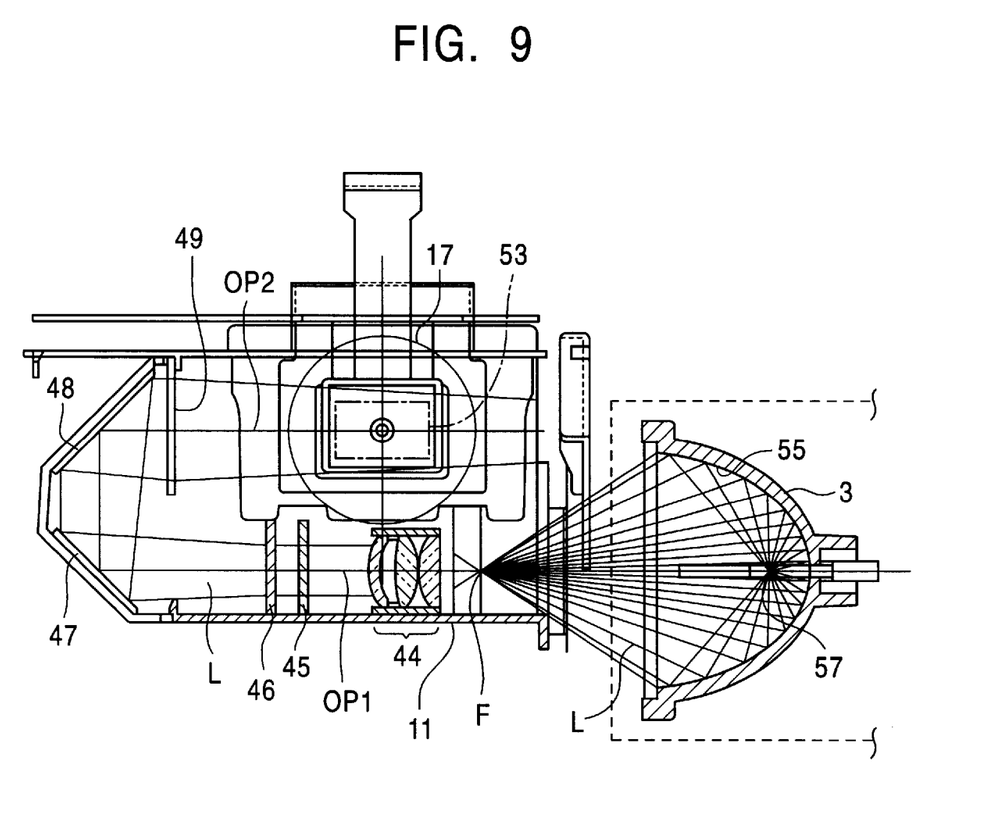
FIG. 9 is a diagram showing the internal construction of the projection type display apparatus as seen from the direction of the arrow A2 of FIG. 7.

FIG. 8 shows the internal construction of the projection type display apparatus 1 as seen from the direction of the arrow A1 of FIG. 7. FIG. 9 shows the internal construction of the projection type display apparatus 1 as seen from the direction of the arrow A2 of FIG. 7.

As shown in FIGS. 7 and 8, the projection lens barrel portion 13 shown in FIGS. 4 through 6 is equipped with a projection lens unit 17. The projection lens unit 17 comprises various lenses 17a through 17g. The projection lens barrel portion 13 has a mechanism which allows focusing of projection light (image light) 5 with respect to the rear surface 104 of the screen 102 shown in FIGS. 2 and 3.

As described above, the main body 11 is equipped with the light source 3, which has, as shown in FIGS. 7 and 9, a reflecting mirror 55 of, for example, an elliptical configuration. Due to this reflecting mirror 55 of an elliptical configuration, light from a lamp 57 of the light source 3 is focused at a focal point F in the main body 11. This lamp 57 may consist, for example, of a metal halide lamp.

As shown in FIG. 9, the light L generated by this lamp 57 is guided by a first optical axis OP1 and a second optical axis OP2 in the main body 11 and finally passes through a single-plate type liquid crystal display device (image display device) 53 before it is transmitted by way of the projection lens unit 17 of the projection lens barrel portion 13 shown in FIGS. 7 and 8 to be projected onto the rear surface 104 of the screen 102 shown in FIGS. 2 and 3 as the projection light 5.

In the main body 11, the following optical elements are arranged along the first optical axis OP1 and the second optical axis OP2.

Figure 10:
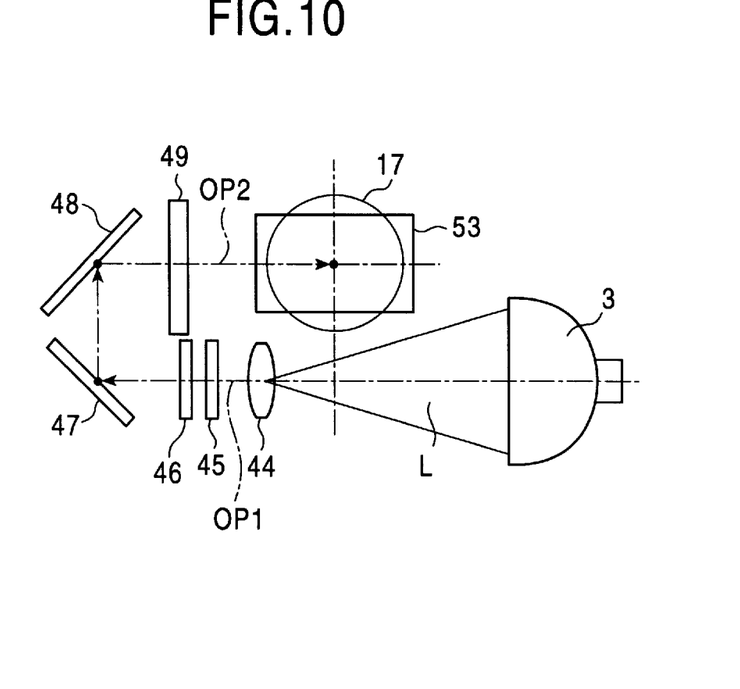
FIG. 10 is a diagram schematically showing the arrangement of optical elements in correspondence with the example of arrangement of optical elements shown in FIG. 9.

First, FIGS. 9 and 10 will be referred to. FIGS. 9 and 10 show optical elements related to the light source 3, the first optical axis OP1 and the second optical axis OP2.

In FIGS. 9 and 10, behind the focal point F of the lamp 3, there are arranged in series a collimator lens 44, a first fly eye lens (optical integrator) 45, a second fly eye lens (optical integrator) 46, and a reflecting mirror 47. When the light L focuses at the focal point F, it is transmitted along the first optical axis OP1 through the collimator lens 44 and passed through the first fly eye lens 45 and the second fly eye lens 46.

The first fly eye lens 45 and the second fly eye lens 46 can concentrate the intensity distribution of the light L that has been turned into a parallel light by the collimator lens 44. The light L, which has been thus concentrated, is reflected by the reflecting mirror 47 by 90° as illuminating light before it reaches the reflecting mirror 48.

The first optical axis OP1 and the second optical axis OP2 are arranged at different positions in the main body 11 and parallel to each other.

Figure 11:
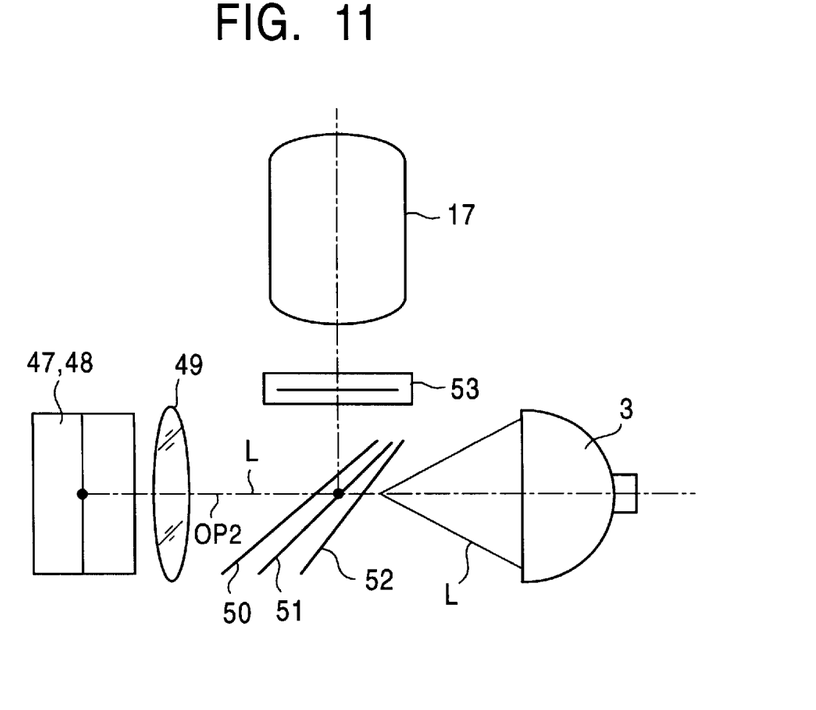
FIG. 11 is a diagram schematically showing the arrangement of optical elements in correspondence with the example of arrangement of optical elements shown in FIG. 7.

As shown in FIGS. 9 and 10, the reflecting mirror 48 and a Fresnel lens 49 are arranged along the second optical axis OP2, and the light L guided along the second optical axis OP2 reach three dichroic mirrors 50, 51 and 52 as shown in FIGS. 7 and 11. The first dichroic mirror 50 serves as a color filter for blue (B), the second dichroic mirror 51 serves as a color filter for red (R), and the third dichroic mirror 52 serves as a color filter for green (G).

After travelling along the second optical axis OP2, the light L is reflected substantially 90° by these dichroic mirrors 50, 51 and 52 and reaches a single-plate type liquid crystal display device (image display device) 53.

The liquid crystal display device 53 displays an image to be projected by an external drive device. The lights L1, L2 and L3 from the dichroic mirrors 50, 51 and 52 are transmitted through this liquid crystal display device 53 to thereby make the image displayed by the liquid crystal display device 53 a colored one. The lights are then transmitted through the projection lens units 17a through 17g of the projection lens barrel portion 13 and projected onto the mirror 103 as the projection light 5, as shown in FIG. 3. The mirror 103 can reflect this projection light 5 and project it onto the rear surface 104 of the screen 102, whereby the user U can watch the screen 102 to see a color image obtained by projecting the image of the liquid crystal image display device 53.

The optical axis of the lights L1, L2 and L3 reflected by the three dichroic mirrors 50, 51 and 52, that is, the optical axis OP3 of the projection lens unit 17, is perpendicular to the second optical axis OP2 in FIGS. 7 and 11.

In this way, the optical axises OP1 and OP2 related to the optical elements from the light source 3 to the projection lens 17 are bent by the reflecting mirrors 47 and 48 and arranged parallel to each other, whereby the size of the main body 11 can be reduced in the direction W of FIG. 7 (the width direction) as compared with the case in which the optical axis is formed as a straight line.

Next, the first fly eye lens 45 and the second fly eye lens 46 shown in FIGS. 9 and 10 will be further described.

Figure 12:
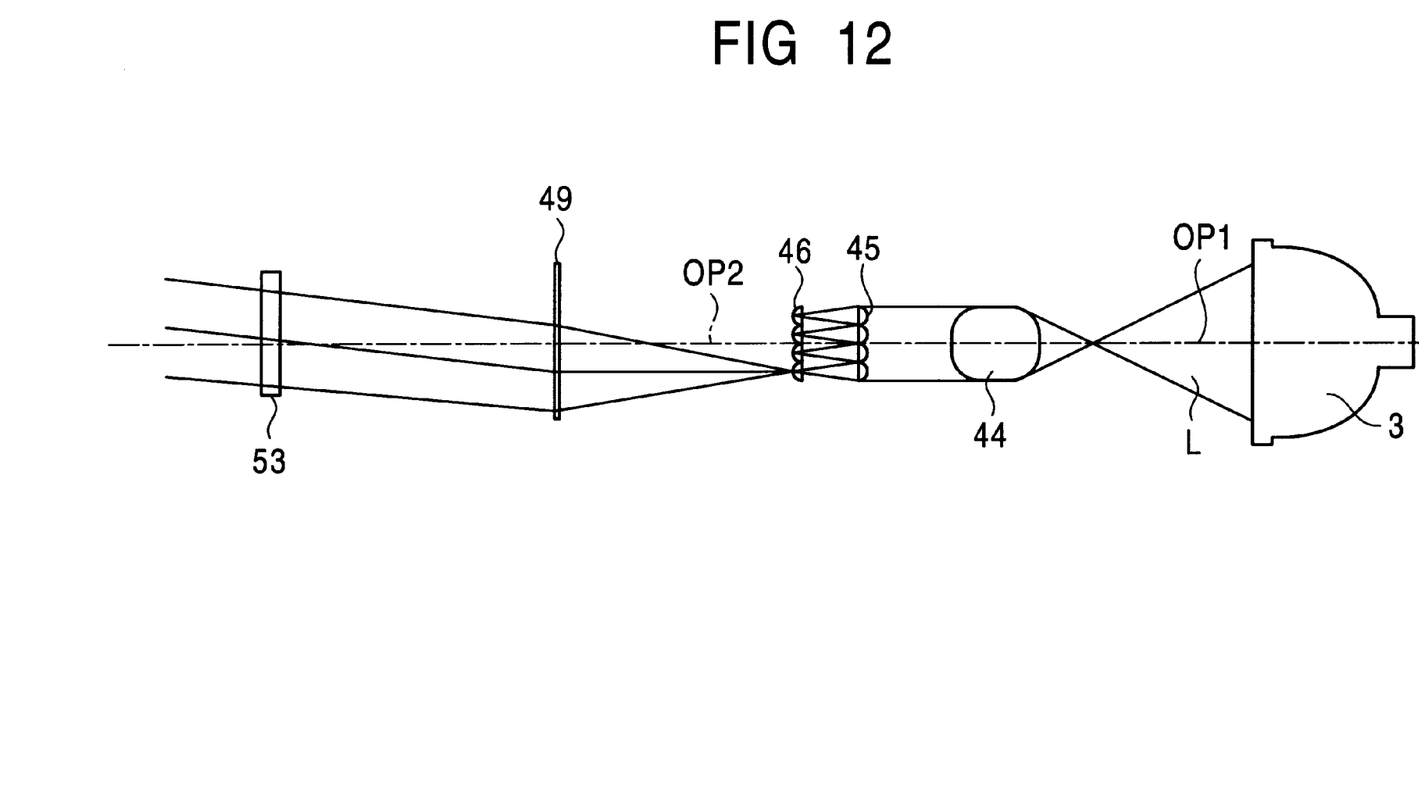
FIG. 12 is a diagram showing an example of the first fly eye lens and the second fly eye lens arranged between the light source and the Fresnel lens.

In the example shown in FIG. 12, the first fly eye lens 45 and the second fly eye lens 46 are arranged between the collimator lens 44 and the Fresnel lens 49. On the output side of the Fresnel lens 49, the liquid crystal display device (image display device) 53 is arranged. On the input side of the collimator lens 44, the light source 3 is arranged. In FIG. 12, the reflecting mirrors 47 and 48 shown in FIG. 9, positioned between the second fly eye lens 46 and the Fresnel lens 49, are omitted in the drawing. Further, while in FIG. 12 the optical axises OP1 and OP2 are shown in a straight line, the first optical axis OP1 and the second optical axis OP2 are in reality bent and arranged in parallel as shown in FIGS. 9 and 10.

Figure 13:
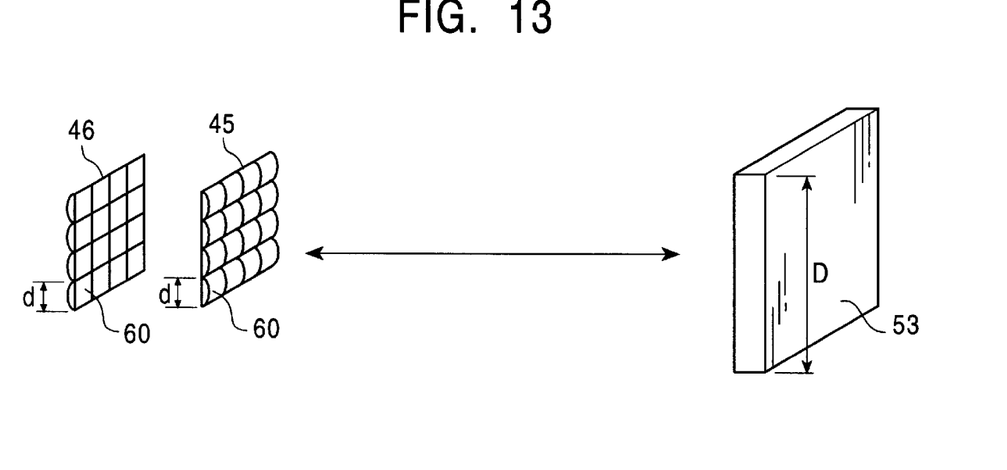
FIG. 13 is a diagram showing the relationship between the size of the first and second fly eye lenses and that of the liquid crystal display device.

As shown in FIG. 13, the first fly eye lens 45 and the second fly eye lens 46 are optical elements for concentrating the intensity distribution of the light L (illuminating) light along the optical axis OP1. The first fly eye lens 45 and the second fly eye lens 46 can, for example, be the same. The first fly eye lens 45 and the second fly eye lens 46 are formed by two-dimensionally arranging a plurality of small unit lenses 60. Thus, the first fly eye lens 45 and the second fly eye lens 46 can concentrate the intensity distribution of the light L transmitted through the collimator 44 along the first optical axis OP1 and transfer it toward the reflecting mirrors 47 and 48 and the Fresnel lens 49 shown in FIG. 9. At this position, the Fresnel lens 49 also concentrates the light L transmitted thereto.

The present invention is characterized in that, as shown in FIG. 13, the relationship between the size (height) d of each unit lens 60 of the first fly eye lens 45 and the second fly eye lens 46 and the size (height) D of the liquid crystal display device D is as follows.

The relationship between the height d of the unit lens 60 and the height D of the liquid crystal display device 53 is as follows:

$$1/16 \leq d/D \leq 1/7$$

Figure 14A:
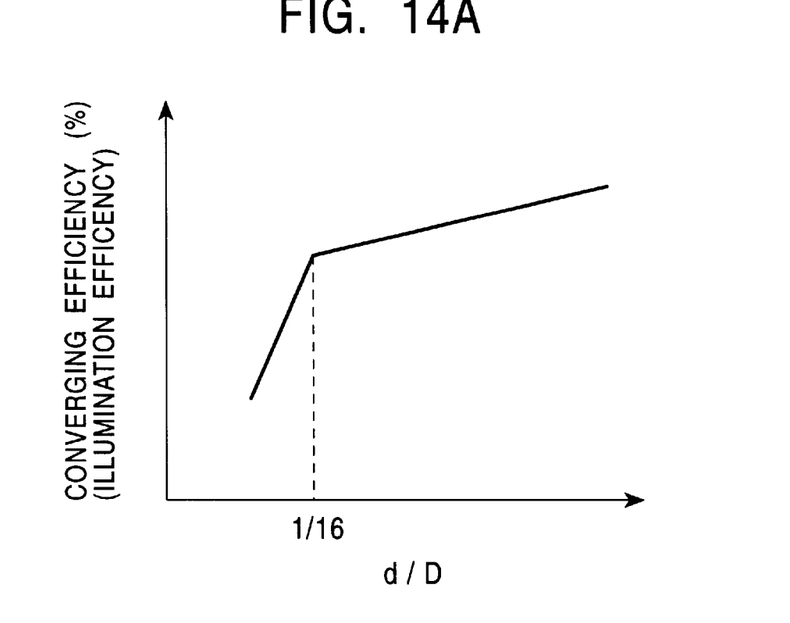
FIGS. 14A and 14B are diagrams showing characteristics related to the ratio of the size d of the unit lenses of the fly eye lenses and the size D of the liquid crystal display device (d/D).
Figure 14B:
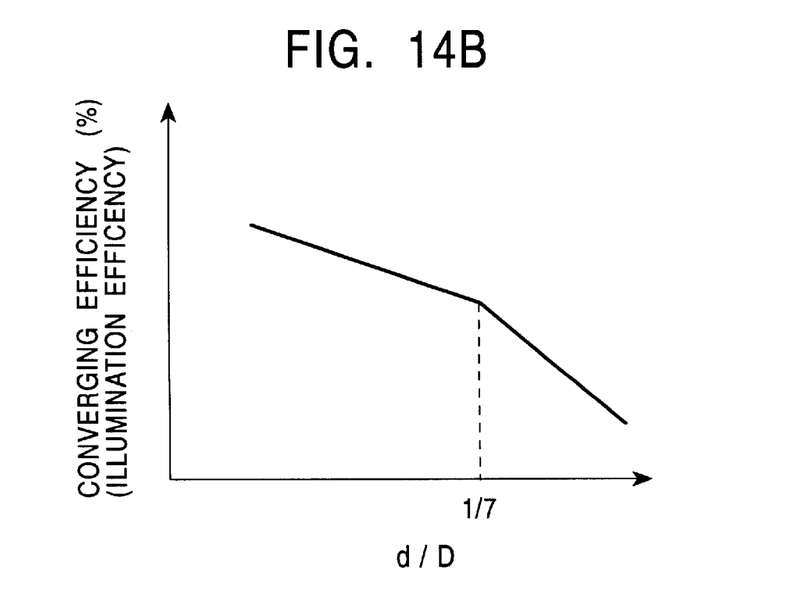

The value of d/D is thus restricted since the characteristics as shown in FIGS. 14A and 14B can be thereby obtained.

FIGS. 14A and 14B show the relationship between the ratio of the size d of the unit lens of the fly eye lens to the size D of the liquid crystal display device and the converging efficiency. As shown in FIG. 14A, if d/D is less than $1/16$, the illuminating light cannot be sufficiently concentrated, and the efficiency of the illuminating light deteriorates. As shown in FIG. 14B, if d/D is more than $1/7$, the intensity distribution of the illuminating light cannot be concentrated.

The first fly eye lens 45 and the second fly eye lens 46 may consist, for example, of plastic lenses, or, more preferably, a combination of a glass product and unit lenses. The surface configuration of each unit lens 60 is, for example, spherical or aspherical (e.g., cylindrical or toroidal).

This makes it possible for the image of the liquid crystal display device 53 to be clearly projected onto the screen by using the illuminating light from the light source 3.

The present invention is not restricted to the above-described embodiment.

In the above-described embodiment, a liquid crystal display device is used as an example of the image display device. This liquid crystal display device may, for example, consist of a liquid crystal display panel using a polycrystalline TFT (thin-film transistor). Further, it is also possible to employ image display devices other than a liquid crystal display device.

The light source is not restricted to one using a metal halide lamp. It is also possible to adopt other kinds of light source, such as a xenon lamp or a halogen lamp.

Apart from the type of projection type image display apparatus, shown in FIG. 2, in which display is effected from the rear surface of the screen, the present invention is also applicable to a type of apparatus in which projection is effected directly onto the front surface of the screen.

The apparatus to which the projection type display apparatus is applicable is not restricted to a television set. It is also applicable to the monitor of a computer, etc.

As described above, in accordance with the present invention, a reduction in size can be achieved, and images can be clearly projected.

What we claim is:

1. A projection display apparatus for projecting an image onto a screen comprising:

a light source for applying irradiation light to a first optical axis extending in a first direction;

reflection means provided in the first optical axis and in a second optical axis parallel to the first optical axis, the reflection means being adapted for reflecting the irradiation light to the second optical axis;

a plurality of dichroic mirrors provided on a third optical axis perpendicular to the first optical axis and the second optical axis, the dichroic mirrors being adapted for reflecting the irradiation light on the second optical axis to the third optical axis; and an image display device for receiving the irradiation light, whereby the image is displayed by the image display device onto the screen by using the irradiation light from the light source.

2. The projection display apparatus according to claim 1, wherein the first optical axis and the third optical axis are parallel to each other.

3. The projection display apparatus according to claim 1, further comprising an optical element provided in the first optical axis and adapted to concentrate the intensity distribution of the irradiation light on the third optical axis.

4. The projection display apparatus according to claim 1, further comprising a reflection element provided in the third optical axis and adapted for reflecting the irradiation light on the third optical axis, wherein the irradiation light reflected by the reflection element is transmitted through the image display device for protecting the image displayed by the image display device onto the screen.

5. The projection display apparatus according to claim 1, wherein the image display device is a single-plate type image display service.

6. The projection display apparatus according to claim 1, wherein the image display device is a liquid crystal display device.

7. The projection display apparatus according to claim 1, wherein the dichroic mirrors perform red, blue and green color filter functions.

8. A projection display apparatus for projecting an image onto a screen comprising:

a light source for applying irradiation light to a first optical axis extending in a first direction;

optical means including a plurality of unit lenses for receiving the irradiation light and for outputting the irradiation light after concentrating an intensity distribution thereof;

an image display device for receiving the irradiation light from the optical means, wherein the optical means is formed by two-dimensionally arranging the plurality of unit lenses and wherein a ratio d/D of a first size d of a unit lens to a second size D of the image display device for ensuring optimum concentration of the irradiation light, is set to be as follows:

$$1/16 \leq d/D \leq 1/2,$$

whereby an image is displayed by the image display device onto the screen by using the irradiation light from the light source;

reflection means provided in the first optical axis and in a second optical axis parallel to the first optical axis, the reflection means being adapted for reflecting the irradiation light from the optical means to the second optical axis; and a plurality of dichroic mirrors provided in a third optical axis perpendicular to the first optical axis and the second optical axis, the dichroic mirrors being adapted for reflecting the irradiation light on the second optical axis to the third optical axis, whereby the irradiation light reflected by the dichroic mirrors projects an image transmitted through the image display device and the image is displayed by the image display device onto the screen.

9. The projection display apparatus according to claim 8, wherein the optical means includes a plurality of fly eye lenses.

10. The projection display apparatus according to claim 8, further comprising a reflection element provided in the third optical axis and for reflecting the irradiation light on the third optical axis, wherein the irradiation light reflected by the reflection element projects an image transmitted through the image display device and displayed by the image display device onto the screen.

11. The projection display apparatus according to claim 8, wherein the image display device is a single-plate type image display device.

12. The projection display apparatus according to claim 8, wherein the image display device is a liquid crystal display device.

13. The projection display apparatus according to claim 8, wherein the dichroic mirrors provide red, blue and green color filter functions.

* * * * *